United States Patent [19]
Gordon

[11] Patent Number: 5,117,245
[45] Date of Patent: May 26, 1992

[54] ELECTRONIC PRINTER OR SCANNER USING A FIBER OPTIC BUNDLE AND AN ARRAY LIGHT EMISSION DEVICE

[75] Inventor: Eugene I. Gordon, Summit, N.J.

[73] Assignee: Photon Imaging Corp., Edison, N.J.

[21] Appl. No.: 467,863

[22] Filed: Jan. 22, 1990

[51] Int. Cl.⁵ .................. G01D 15/14; G02B 6/04; H01J 5/16

[52] U.S. Cl. .................. 346/160; 250/227.26; 359/443

[58] Field of Search ............... 355/1; 346/107 R, 160; 350/96.24, 96.25; 250/227.26

[56] References Cited

U.S. PATENT DOCUMENTS 3,952,311  4/1976  Lapeyre .................. 354/5
4,549,784  10/1985  Inokuchi .................. 355/1
4,674,834  6/1987  Margolin .................. 355/1 X
4,748,680  5/1988  Margolin .................. 355/1 X
4,760,421  7/1988  Margolin .................. 355/1 X
4,927,230  5/1990  Tokumitsu .................. 350/96.24

Primary Examiner—George H. Miller, Jr.
Attorney, Agent, or Firm—Herbert M. Shapiro

[57] ABSTRACT

An electronic printer employing a fiber optic bundle arranged linearly at a first face and in an area array in a second face also employs an area light emission device for directing light signals into the fibers of the second face simultaneously in a manner to faithfully reproduce an image at the first face even though there was no predetermined relationships between the ends of the same fibers in the two faces. An initialization procedure establishes the addresses of the cells which correspond to pixels in the first face. Data representative of the on or off state of the cells is stored in memory and applied to all the enabled cells simultaneously also. The arrangement is usefull for similar scanners.

7 Claims, 1 Drawing Sheet

ELECTRONIC PRINTER OR SCANNER USING A FIBER OPTIC BUNDLE AND AN ARRAY LIGHT EMISSION DEVICE

FIELD OF THE INVENTION

This invention relates to electronic printers and more particularly to such printers which include a bundle of optical fibers.

BACKGROUND OF THE INVENTION

U.S. Pat. No. 4,760,421 issued July 26, 1988 to George D. Margolin and now assigned to the assignee of the present application, describes a printer which employs a random bundle of optical fibers. The bundle has its fibers arranged in a linear array in a first face of the bundle and in an area array in a second face. The linear face is abutted against or in close proximity to an electrostatic belt, or like photo-optic medium, defining a linear segment across the belt. The area face is in juxtaposition with a light source operative to direct an electron beam to a sequence of positions of the face at which light is generated. A cathode ray tube (CRT) is described as the light source and the beam is directed at the CRT face plate so that the phosphor there emits light into a sequence of fiber ends (pixels) in the second face of the bundle to correspond to the proper sequence of fiber ends in the linear face, to faithfully transmit an image through the bundle.

There is no preestablished relationship between the fiber ends in the linear or first face of the bundle and the fiber ends in the area or second face of the bundle. The proper relationship between the position of the end of each fiber in the linear face and the position of the opposite end of each fiber in the area face is determined by an initialization procedure in which an address string is determined for positions on the faceplate of the CRT at which a sequence of light signals is to be generated to faithfully reproduce a stored image for the linear segment coupled to the linear end. A two-dimensional image is constructed on the belt by selectively discharging the belt via the transmitted light signals, linear segment after linear segment.

BRIEF DESCRIPTION OF AN ILLUSTRATIVE EMBODIMENT OF THIS INVENTION

It has been discovered that the light signals for discharging a linear segment of the electrostatic belt need not be provided in sequence. Instead, once the appropriate sequence of face plate addresses is established, all the light signals may be provided simultaneously or in groups. Of course this is not possible with a CRT which operates to move a single spot (the beam) to one position after another. But the realization that the spots may be provided simultaneously leads to the consideration of alternative light-signal supply mechanisms.

Copending application Ser. No. 468,833 filed on even date herewith for Eugene I. Gordon and assigned to the assignee of the present application discloses the combination of a linear light source and digital control mechanism for providing simultaneously those light signals from the sequence of addresses which lie in one row of the second face of the bundle. That is to say, if the sequence of addresses determined during an initialization procedure be thought of as divided into rows which correspond to cells of a linear array of light emitting cells, then all the appropriate cells of the linear array which correspond in positions to the addresses of a row can be operated simultaneously. The image of the linear array of light emitting cells is then focussed on the next segment of the area face and the process is repeated until the entire sequence of addresses for the linear segment coupled to the linear face of the bundle is completed.

The present invention is directed to the combination of a fiber optic bundle, as described with the area face coupled to an area liquid crystal shutter (LCS) or a 2-D field emission device (or like array of light emitting cells) which illustratively has a relatively large number of light emitting cells compared to the number of fibers in the area face of the bundle. The LCS or field emission device (or an image of the device), is coupled optically to the area face of the bundle and the addresses of the cells of the device which correspond to fiber ends (viz: pixel positions) in the linear end of the bundle are determined during an initialization period. Control means are provided to enable all the cells having addresses in the look up table simultaneously for each of the consecutive linear segments of the electrostatic belt or any suitable photosensitive medium.

The recognition that the cells corresponding to the addresses of the look up table generated during a prior initialization procedure may be enabled simultaneously for activation according to "on-off" data of an image stored in memory and the use of, for example, an area LCS or field light emitting device capable of simultaneous addressing is a significant departure from prior art thinking.

The use of an area light source device in this manner not only provides a significantly lower cost printer but improves speed of operation significantly and is to be distinguished form the use of an area light source device as a CRT equivalent which would operate sequentially as a "flying spot" rather than in parallel by simultaneous enablement of a set of addresses as required here.

BRIEF DESCRIPTION OF AN ILLUSTRATIVE EMBODIMENT OF THE INVENTION

FIG. 1 is a schematic block diagram of an electronic printer in accordance with the principle of this invention.

DETAILED DESCRIPTION OF AN ILLUSTRATIVE EMBODIMENT OF THIS INVENTION

Figure 1:
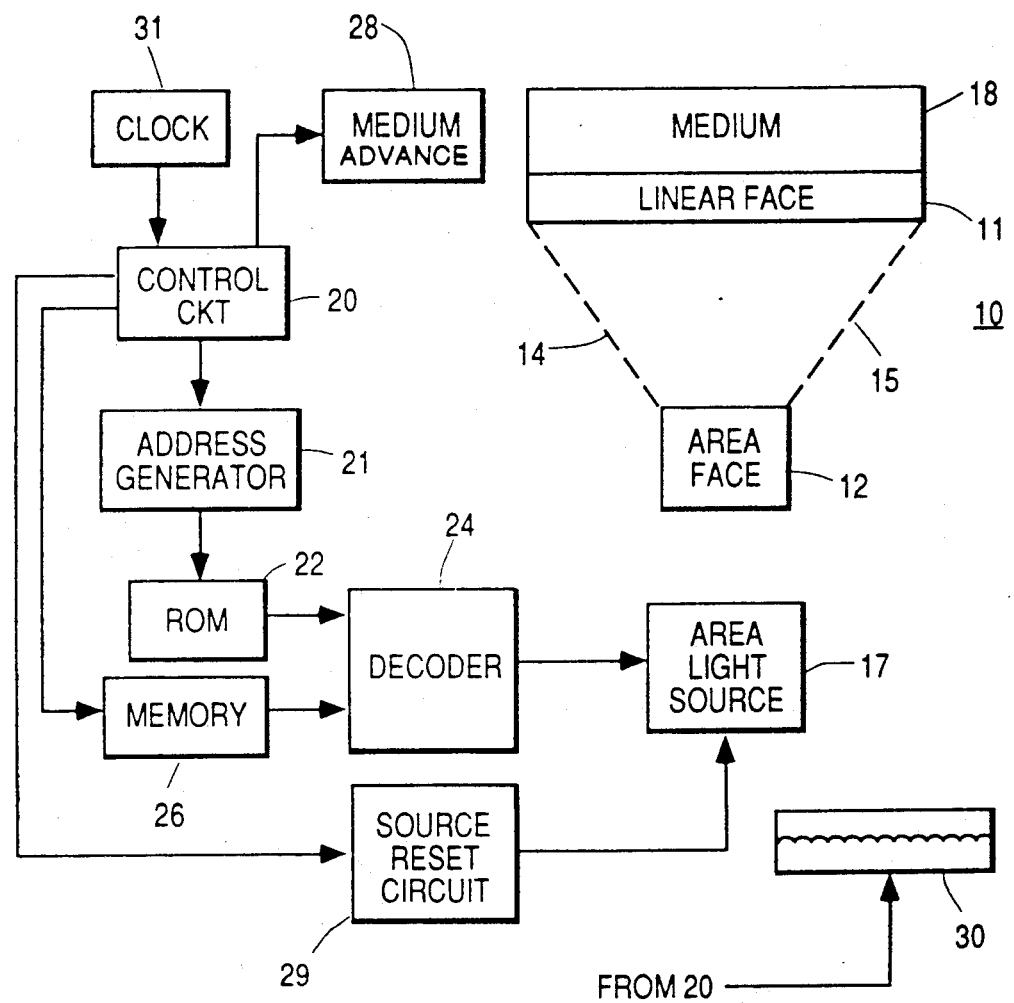

FIG. 1 shows an electronic printer 10 including a fiber optic bundle having the ends of the fibers arranged in a linear array in a first face and in an area array in a second face. The linear face is represented by elongated rectangle 11 and the area face is represented by square 12. The fiber bundle appears as a shank of hair and is represented by broken lines 14 and 15. The second face need not be square. It could be circular, annular, rectangular, . . . etc.

An area liquid crystal shutter light source (LCS) or field emission device (FED) is coupled to area face 12 such that, when activated, the cells of the LCS or FED source generate light simultaneously into a set of fiber ends in area face 12. The field emission source is represented by block 17. A suitable field emission source or device is available (in prototype stage) from Coloray Display Corp, Fremont, Calif. Suitable LCS device are available from many sources.

Linear face 11 is coupled, illustratively, to an electrostatic medium 18 and defines a linear segment on the medium in which electrostatic discharge occurs according to the instant light pattern issuing from face 11. The electrostatic medium is moved from linear segment to linear segment by medium-advance apparatus represented by block 20. Successive light patterns issuing from face 11 discharge medium 18 to produce an image.

The image is transferred, for example, to plane paper by the familiar xerographic technique where the medium passes toner, transfer and fixer stations included in a module (not shown) available commercially. Alternatively, linear face 11 could directly expose a photographic paper or film.

LCS (or FED) source 17 includes cells, (not shown) which are closely spaced. The fiber ends in face 12 are on thirty mil centers for an illustrative 2550 fibers required for an eight and one half inch linear face having three hundred dots per inch (dpi). Thus source 17 (or the image of the source) has many cells for each fiber end. Presently available LCS area sources are relatively ross in scale. But an image of the LCS source can be directed to the area face of the fiber optic bundle via a lens system (not shown) to achieve the desired size relationship between the number of individual sources of light per fiber end.

The movement of medium 18 is controlled by control circuit 20. An output of control circuit 20 is connected to an input to address generator 21. The output of address generator 21 is connected to ROM 22. ROM 22 stores the address sequence determined during the prior initialization procedure as discussed in the above-mentioned patent. The output of the ROM is connected to the input to a decoder 24. The output of decoder 24 is connected to inputs to area light source 17.

The output of memory 26 also is connected to inputs to decoder 24. Memory 26 contains data representative of the image to be generated. The cells having addresses in the address sequence in ROM 22 are open or closed (passing light or not) according to the data stored in memory 26.

Source reset circuit 29 is connected to source 17 and is operative under the control of control circuit 20 to disable all cells of source 17. Block 30 represents the (backplane) light source shuttered by the cells of (LCS) source 17. The various components of the printer of FIG. 1 are synchronized by control circuit 20 with respect to a clock represented by block 31.

Although the invention has been described primarily in terms of an LCS device, any area array of light sources controllably providing a point of light for each fiber end in the area face of the fiber optic bundle of FIG. 1 is suitable. Also, the invention has been described in terms of a printer; but the invention also can be used in the implementation of a scanner. The scanner is implemented by including a photosensor (multicell) at the linear face of the fiber optic bundle to sense light reflected from or transmitted through paper, optically coupled to the linear face in a manner analogous to that described in copending application Ser. No. 325,455 filed Mar. 17, 1989 for Eugene I. Gordon now U.S. Pat. No. 4,918,304 issued Apr. 17, 1990, and assigned to the assignee of the present application.

What is claimed is:

1. Apparatus comprising a random bundle of optical fibers having the ends of the fibers arranged in a linear array in a first face and in an area array in a second face, an area array of light cells optically coupled to said area face so that light signals generated by said cells enter associated ones of the fiber ends in said area face, said apparatus including control means for enabling a predetermined set of said cells simultaneously.

2. Apparatus as set forth in claim 1 wherein said first face is coupled optically to photo sensitive medium in a manner to define a linear segment across said medium, said apparatus also including memory means for storing data representative of the on-off state of each of said enabled cells and means for applying said data to said enabled cells simultaneously for each of said linear segments.

3. Apparatus as set forth in claim 2 wherein said photo sensitive medium is an electrostatic medium and said light signals are operative to selectively discharge a linear segment of said medium.

4. Apparatus as set forth in claim 3 also including means for moving said medium from an instant linear segment to consecutive ones of said linear segments, said control and memory means being responsive to synchronizing signals for selectively discharging consecutive linear segments.

5. Apparatus as set forth in claim 1 wherein said set correspond to all the fiber ends in said area face, said apparatus including memory means for storing data representative of the on-off state of each of the enabled cells of said and means for applying said data by all of said enabled cells simultaneously.

6. Apparatus as set forth in claim 5 wherein said photo sensitive medium is an electrostatic medium and said light signals are operative to selectively discharge a linear segment of said medium.

7. Apparatus as set forth in claim 6 also including means for moving said medium such that successive linear segments are coupled to said first face wherein said control means is operative to enable the cells of set simultaneously in synchronism with each said linear segments.

* * * * *